US008775073B2

(12) United States Patent
Denaro

(10) Patent No.: US 8,775,073 B2
(45) Date of Patent: *Jul. 8, 2014

(54) DATA MINING IN A DIGITAL MAP DATABASE TO IDENTIFY INSUFFICIENT MERGE LANES ALONG ROADS AND ENABLING PRECAUTIONARY ACTIONS IN A VEHICLE

(75) Inventor: Robert Denaro, Long Grove, IL (US)

(73) Assignee: Navteq B.V., Veldhoven (NL)

( * ) Notice: Subject to any disclaimer, the term of this patent is extended or adjusted under 35 U.S.C. 154(b) by 926 days.

This patent is subject to a terminal disclaimer.

(21) Appl. No.: 12/156,303

(22) Filed: May 30, 2008

(65) Prior Publication Data

US 2009/0299615 A1 Dec. 3, 2009

(51) Int. Cl.
G01C 21/32 (2006.01)
G01C 21/00 (2006.01)

(52) U.S. Cl.
USPC .......... 701/450; 701/411; 701/201; 701/207; 701/167; 701/208; 701/437; 701/414; 701/425; 701/410; 340/990; 340/995.21

(58) Field of Classification Search
USPC ......... 701/208, 201, 207, 437, 209, 210, 414, 701/167, 425, 410, 533; 340/990, 995, 340/995.21

See application file for complete search history.

(56) References Cited

U.S. PATENT DOCUMENTS

| 4,775,865 | A | 10/1988 | Smith et al. |
|---|---|---|---|
| 5,280,632 | A | 1/1994 | Jung-Gon |
| 5,315,295 | A | 5/1994 | Fujii |
| 5,617,086 | A | 4/1997 | Klashinsky et al. |
| 5,635,920 | A | 6/1997 | Pogue et al. |
| 5,642,093 | A | 6/1997 | Kinoshita et al. |
| 5,757,949 | A | 5/1998 | Kinoshita et al. |
| 5,904,728 | A | 5/1999 | Tamai et al. |
| 5,944,768 | A | 8/1999 | Ito et al. |
| 5,978,724 | A | 11/1999 | Sekine |
| 5,978,731 | A | 11/1999 | Matsuda |
| 6,008,741 | A | 12/1999 | Shinagawa et al. |
| 6,064,941 | A | 5/2000 | Nimura et al. |
| 6,067,497 | A | 5/2000 | Sekine et al. |
| 6,084,510 | A | 7/2000 | Lemelson et al. |
| 6,088,659 | A | 7/2000 | Kelley et al. |
| 6,092,005 | A | 7/2000 | Okada |

(Continued)

FOREIGN PATENT DOCUMENTS

DE 10030819 1/2002

*Primary Examiner* — Adam Tissot
(74) *Attorney, Agent, or Firm* — Lempia Summerfield Katz LLC

(57) ABSTRACT

Disclosed is a feature for a vehicle that enables taking precautionary actions in response to conditions on the road network around or ahead of the vehicle, in particular, an intersection without traffic signals and without a sufficient merge lane. A database that represents the road network is used to determine locations where roads meet without a traffic signal and without a sufficient merge lane. Then, precautionary action data is added to the database to indicate a location at which a precautionary action is to be taken about the location of the insufficient merge lane. A precautionary action system installed in a vehicle uses this database, or a database derived therefrom, in combination with a positioning system to determine when the vehicle is at a location that corresponds to the location of a precautionary action. When the vehicle is at such a location, a precautionary action is taken by a vehicle system as the vehicle is approaching a location of an insufficient merge lane.

20 Claims, 6 Drawing Sheets

(56) References Cited

U.S. PATENT DOCUMENTS

| | | |
|---|---|---|
| 6,141,619 A | 10/2000 | Sekine |
| 6,157,891 A | 12/2000 | Lin |
| 6,161,071 A | 12/2000 | Shuman et al. |
| 6,188,316 B1 | 2/2001 | Matsuno et al. |
| 6,199,011 B1 | 3/2001 | Matsuda |
| 6,204,778 B1 | 3/2001 | Bergan et al. |
| 6,208,927 B1 | 3/2001 | Mine et al. |
| 6,223,125 B1 | 4/2001 | Hall |
| 6,298,296 B1 | 10/2001 | Takahashi |
| 6,353,785 B1 | 3/2002 | Shuman et al. |
| 6,356,839 B1 | 3/2002 | Monde et al. |
| 6,381,536 B1 | 4/2002 | Satoh et al. |
| 6,389,332 B1 | 5/2002 | Hess et al. |
| 6,401,023 B1 | 6/2002 | Takahashi |
| 6,411,896 B1 | 6/2002 | Shuman et al. |
| 6,415,222 B1 * | 7/2002 | Sato et al. ............ 701/208 |
| 6,415,226 B1 | 7/2002 | Kozak |
| 6,424,904 B1 | 7/2002 | Takahashi et al. |
| 6,466,867 B1 * | 10/2002 | Sakashita ............ 701/211 |
| 6,470,265 B1 | 10/2002 | Tanaka |
| 6,480,783 B1 | 11/2002 | Myr |
| 6,674,434 B1 | 1/2004 | Chojnacki et al. |
| 6,675,085 B2 | 1/2004 | Straub |
| 6,696,976 B1 | 2/2004 | Hansen |
| 6,718,262 B2 | 4/2004 | Matsuda et al. |
| 6,820,005 B2 | 11/2004 | Matsuda et al. |
| 6,850,841 B1 | 2/2005 | Casino |
| 6,856,902 B1 | 2/2005 | Mitchem ............ 701/213 |
| 6,864,784 B1 | 3/2005 | Loeb |
| 6,873,892 B2 | 3/2005 | Katz et al. |
| 6,931,319 B2 | 8/2005 | Adachi |
| 6,952,647 B2 | 10/2005 | Hasegawa et al. |
| 6,954,696 B2 | 10/2005 | Ihara et al. |
| 7,007,011 B1 | 2/2006 | Joshi |
| 7,171,306 B2 * | 1/2007 | Hirose ............ 701/209 |
| 7,194,347 B2 | 3/2007 | Harumoto et al. |
| 7,259,746 B2 | 8/2007 | Kato et al. |
| 7,266,438 B2 | 9/2007 | Kellum et al. |
| 7,340,341 B2 | 3/2008 | Adachi |
| 7,400,963 B2 | 7/2008 | Lee et al. |
| 7,479,897 B2 | 1/2009 | Gertsch et al. |
| 7,516,041 B2 * | 4/2009 | Smartt et al. ............ 702/167 |
| 7,680,749 B1 | 3/2010 | Golding et al. |
| 7,751,973 B2 | 7/2010 | Ibrahim |
| 2001/0001133 A1 | 5/2001 | Hotta |
| 2002/0069019 A1 | 6/2002 | Lin |
| 2002/0077733 A1 | 6/2002 | Bidaud |
| 2002/0128752 A1 | 9/2002 | Joshi |
| 2002/0161513 A1 | 10/2002 | Bechtolsheim et al. |
| 2003/0016145 A1 | 1/2003 | Bateman |
| 2003/0016146 A1 | 1/2003 | Bates et al. |
| 2003/0130780 A1 | 7/2003 | Shiimado et al. |
| 2003/0182051 A1 | 9/2003 | Yamamoto |
| 2004/0022416 A1 | 2/2004 | Lemelson et al. |
| 2004/0039523 A1 | 2/2004 | Kainuma et al. |
| 2004/0107042 A1 | 6/2004 | Seick |
| 2004/0143385 A1 | 7/2004 | Smyth et al. |
| 2004/0267455 A1 | 12/2004 | Hatano et al. |
| 2005/0065682 A1 | 3/2005 | Kapadia et al. |
| 2005/0251335 A1 | 11/2005 | Ibrahim |
| 2006/0064239 A1 | 3/2006 | Ishii |
| 2006/0097859 A1 | 5/2006 | Nordbruch |
| 2006/0114125 A1 | 6/2006 | Kubota et al. |
| 2006/0149780 A1 | 7/2006 | Joshi |
| 2006/0220904 A1 | 10/2006 | Jarlengrip |
| 2007/0050127 A1 | 3/2007 | Kellum et al. |
| 2007/0050130 A1 | 3/2007 | Grimm et al. |
| 2007/0296574 A1 | 12/2007 | Smith et al. |
| 2008/0077309 A1 | 3/2008 | Cobbold |
| 2008/0215238 A1 * | 9/2008 | Geelen et al. ............ 701/210 |
| 2009/0140887 A1 | 6/2009 | Breed et al. |
| 2009/0295598 A1 | 12/2009 | Denaro |
| 2009/0295604 A1 | 12/2009 | Denaro |
| 2009/0296630 A1 | 12/2009 | Chen et al. |
| 2009/0299615 A1 | 12/2009 | Denaro |
| 2009/0299616 A1 | 12/2009 | Denaro |
| 2009/0299617 A1 | 12/2009 | Denaro |
| 2009/0299622 A1 | 12/2009 | Denaro |
| 2009/0299624 A1 | 12/2009 | Denaro |
| 2009/0299625 A1 | 12/2009 | Denaro |
| 2009/0299626 A1 | 12/2009 | Denaro |
| 2009/0300035 A1 | 12/2009 | Denaro |
| 2009/0300053 A1 | 12/2009 | Denaro |
| 2009/0300067 A1 | 12/2009 | Denaro |
| 2010/0191421 A1 | 7/2010 | Nilsson |
| 2010/0332266 A1 | 12/2010 | Tamir et al. |

* cited by examiner

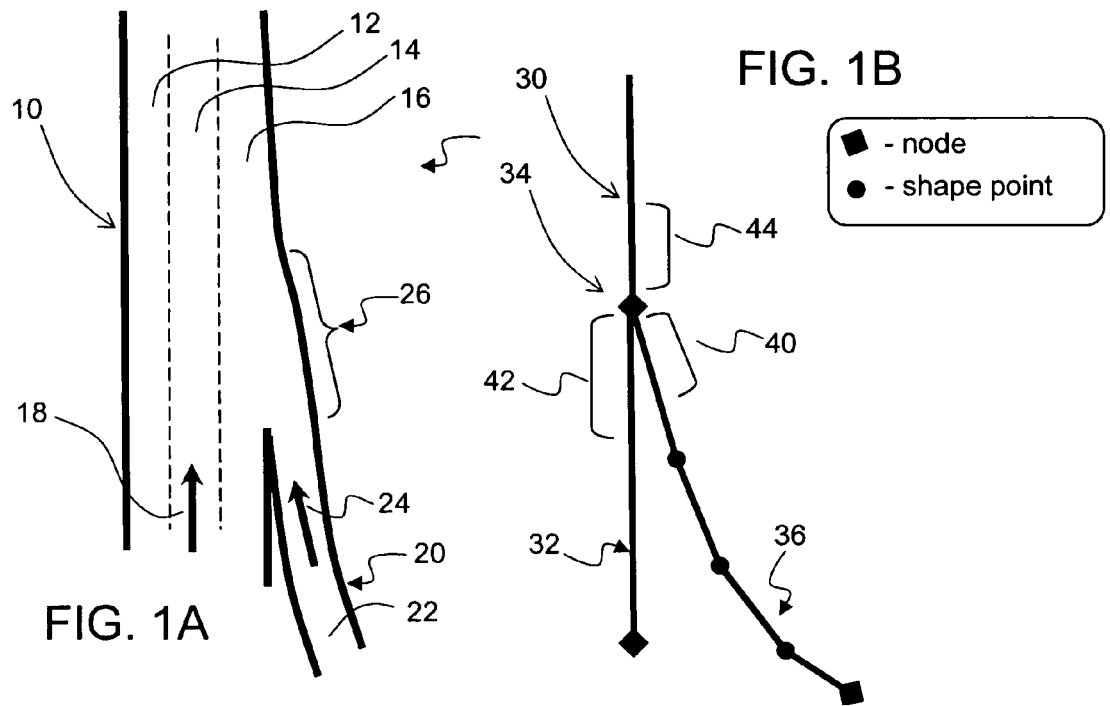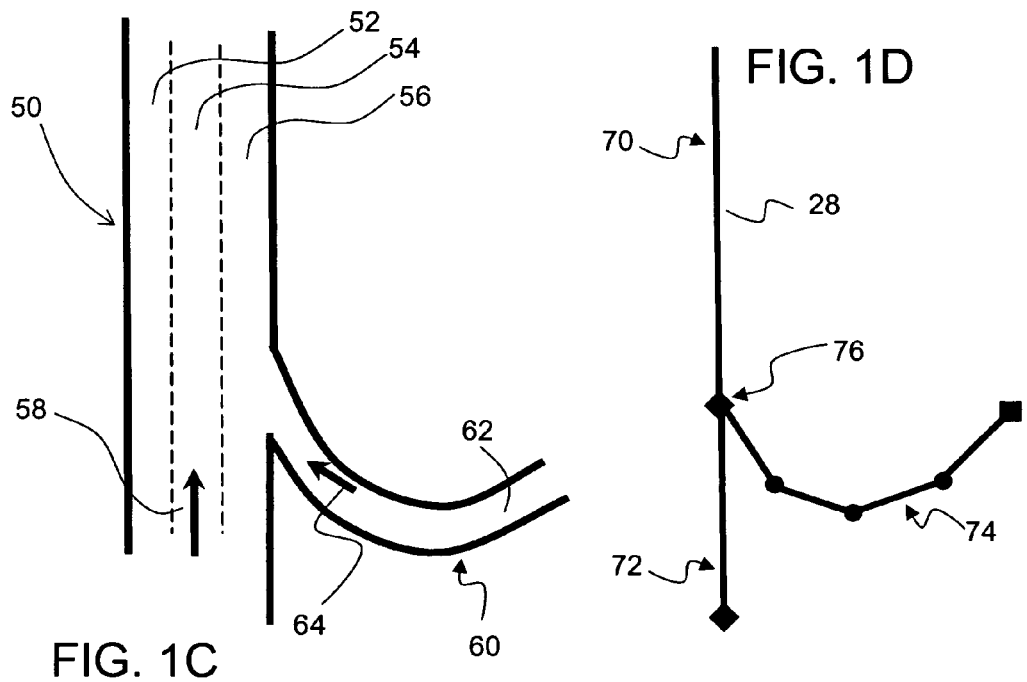

US 8,775,073 B2

DATA MINING IN A DIGITAL MAP DATABASE TO IDENTIFY INSUFFICIENT MERGE LANES ALONG ROADS AND ENABLING PRECAUTIONARY ACTIONS IN A VEHICLE

REFERENCE TO RELATED APPLICATION

The present patent application is related to the copending patent application Ser. No. 12/156,264, filed on the same date, entitled "DATA MINING TO IDENTIFY LOCATIONS OF POTENTIALLY HAZARDOUS CONDITIONS FOR VEHICLE OPERATION AND USE THEREOF," the entire disclosure of which is incorporated by reference herein.

BACKGROUND OF THE INVENTION

The present invention relates to a method and system that enables taking a precautionary action in a vehicle, such as providing a warning to a vehicle driver about a potentially difficult or hazardous driving condition on the road network.

Advanced driver assistance systems ("ADAS"), including active safety and fuel economy systems, have been developed to improve the comfort, efficiency, safety, and overall satisfaction of driving. Examples of these advanced driver assistance systems include adaptive headlight aiming, adaptive cruise control, lane departure warning and control, curve warning, speed limit notification, hazard warning, predictive cruise control, and adaptive shift control, as well as others. Some of these advanced driver assistance systems use a variety of sensor mechanisms in the vehicle to determine the current state of the vehicle and the current state of the roadway in front of the vehicle. These sensor mechanisms may include radar, infrared, ultrasonic and vision-oriented sensors, such as digital video cameras and lidar. Some advanced driver assistance systems also use digital map data. Digital map data can be used in advanced driver assistance systems to provide information about the road network, road geometry, road conditions and other items associated with the road and terrain around the vehicle. Digital map data is not affected by environmental conditions, such as fog, rain or snow. In addition, digital map data can provide useful information that cannot reliably be provided by cameras or radar, such as curvature, grade, bank, speed limits that are not indicated by signage, traffic and lane restrictions, etc. Further, digital map data can provide a predictive capability well beyond the range of other sensors or even beyond the driver's vision to determine the road ahead of the vehicle, around corners, over hills or beyond obstructions. Accordingly, digital map data can be a useful addition for some advanced driver assistance systems.

Although these kinds of systems provide useful features, there exists room for further improvements. For example, it would be useful to identify locations on the road network where a relatively high number of traffic accidents have occurred. However, statistics pertaining to accidents are maintained by various different administrative entities that use different formats, standards, reporting methods, reporting periods, etc. Accordingly, it is difficult to obtain consistent information about traffic accidents on roads in a large geographic region, such as the entire United States or Europe. Moreover, data indicating locations where a statistically large number of traffic accidents occur may not indicate the causes of the accidents or how accidents can be avoided.

Accordingly, it is an objective to provide a system that facilitates taking a precautionary action in a vehicle, such as providing a warning to a vehicle operator, when approaching a location where accidents may occur.

SUMMARY OF THE INVENTION

To address these and other objectives, the present invention comprises a feature that enables taking a precautionary action in a vehicle as the vehicle approaches the location where roads meet or merge without a sufficient merge lane. The precautionary action may be a warning message provided to the vehicle driver to alert the vehicle driver about the location where the roads meet without a sufficient merge lane. Alternatively, the precautionary action may be an actual modification of the operation or control of the vehicle, such as braking, accelerating, or maneuvering the vehicle, or activating a sensor. Alternatively, the precautionary action may be providing an input to an algorithm that also processes inputs from other sensors for taking such actions. In another alternative, the precautionary action may include a combination of any of these aforementioned actions.

According to another aspect, a database that represents the road network is used to determine locations where roads meet or merge without a sufficient merge lane. Then, precautionary action data is added to the database to indicate a location at which a precautionary action is to be provided about the location where roads meet or merge without a sufficient merge lane.

According to further aspects, a precautionary action system installed in a vehicle uses this database, or a database derived therefrom, in combination with a positioning system, to determine when the vehicle is at a location that corresponds to the location where a precautionary action should be taken. When the vehicle is at such a location, the precautionary action is taken, such as providing a warning to the vehicle operator, as the vehicle is approaching a location where roads meet or merge without a sufficient merge lane. Alternatively, the precautionary action may consist of an actual modification of the operation or control of the vehicle, such as braking, accelerating, or maneuvering the vehicle, or activating a sensor. Alternatively, the precautionary action may include providing an input to an algorithm that also processes inputs from other sensors for taking such actions. Alternatively, the precautionary action may be an adjustment of sensitivities of other ADAS applications such as increasing the control authority and sensitivity of a lane departure warning or control system to lane edge approach and violation. In another alternative, the precautionary action may include a combination of any of these aforementioned actions.

BRIEF DESCRIPTION OF THE DRAWINGS

FIG. 1A is an illustration of a portion of a road network where roads merge with a sufficient merge lane.

FIG. 1B shows how the roads depicted in FIG. 1A are represented as data in a database.

FIG. 1C is an illustration of a portion of a road network where roads merge without a sufficient merge lane.

FIG. 1D shows how the roads depicted in FIG. 1C are represented as data in a database.

DETAILED DESCRIPTION OF THE DESCRIPTION OF THE PRESENTLY PREFERRED EMBODIMENTS

Figure 1E:
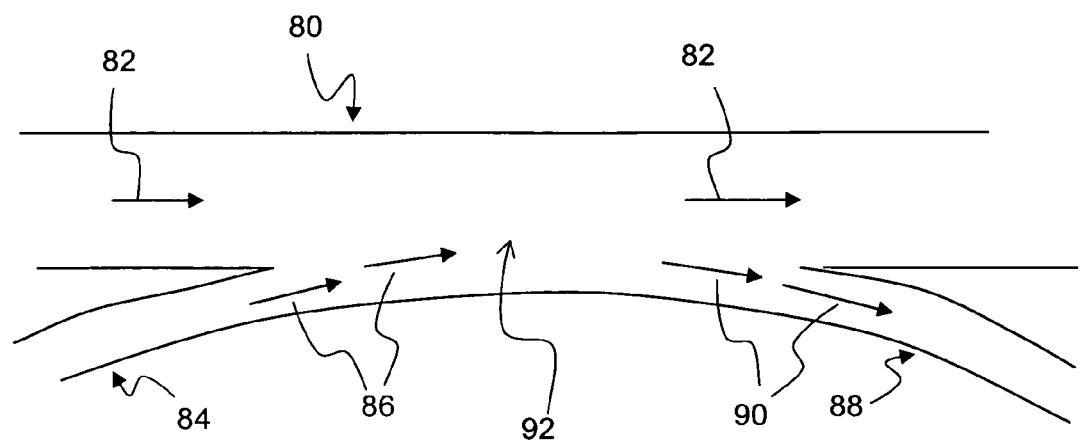
FIG. 1E is an illustration of another portion of a road network where roads merge without a sufficient merge lane.

FIG. 1A depicts a portion of an actual road network. The road network includes a road segment 10. The road segment 10 includes three lanes 12, 14 and 16 for carrying vehicle traffic in the direction of travel indicated by the arrow 18. An entrance ramp 20 consisting of a single lane 22 connects to the road segment 10. The entrance ramp 20 carries traffic in the direction indicated by the arrow 24. As shown in FIG. 1A, the entrance ramp 20 gradually merges into the road 10. The gradual merger occurs over a distance 26. Along the distance 26, the width of the entrance ramp 20 gradually decreases as it merges into the lane 16 of road 10.

Figure 2:
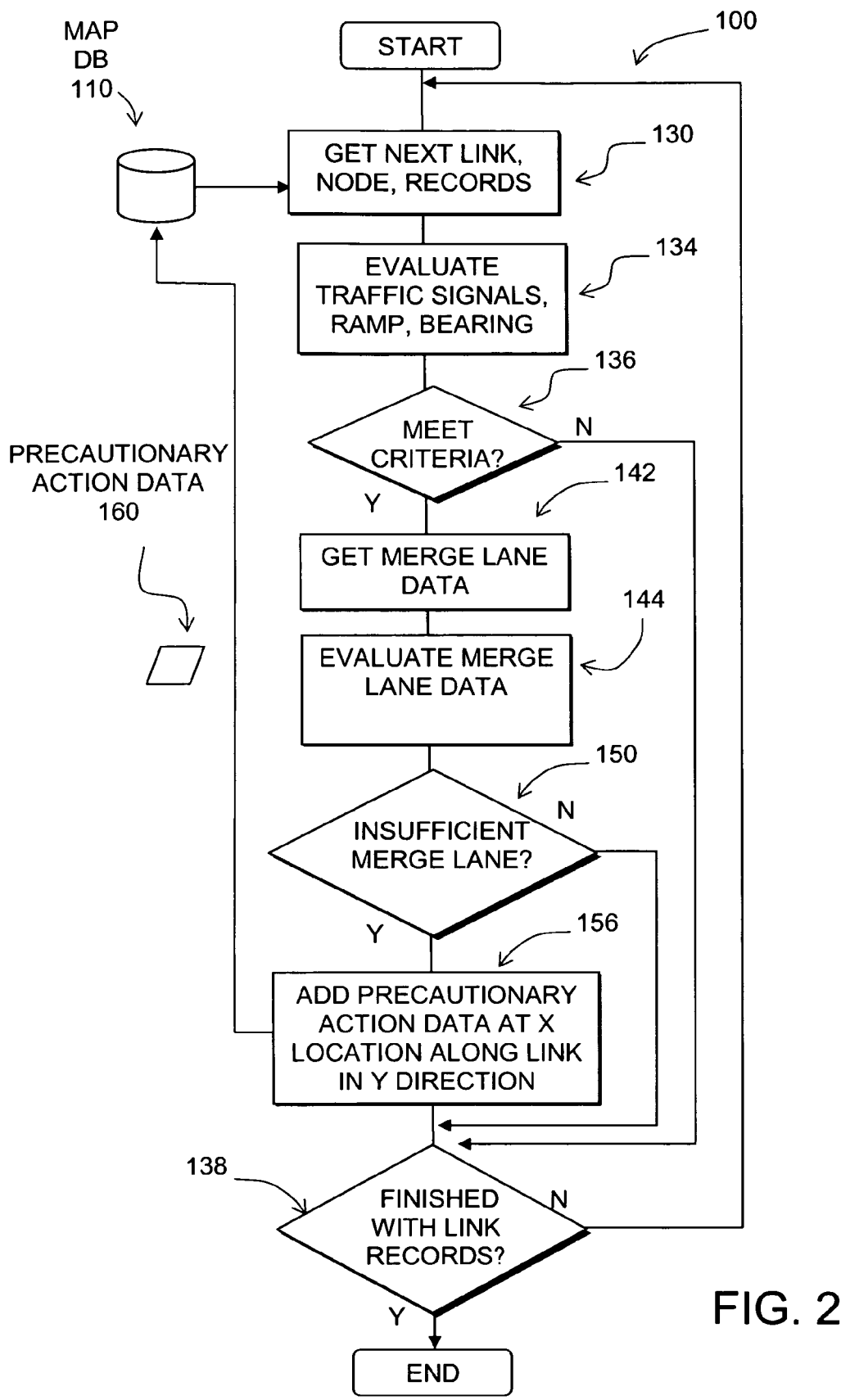
FIG. 2 is a flowchart of a process that uses a database that represents a road network to identify conditions such as the one shown in FIGS. 1C and 1E.

FIG. 1B is an illustration of how the roads in FIG. 1A are represented by data contained in a map database (such as the database 110 in FIG. 2). Roads are represented as separate road segments, each of which is represented by a data record that defines a line that extends between two endpoints, or nodes. The location of the road segment is defined by the data indicating the locations, e.g., geographic coordinates, of the endpoints (or nodes) of the road segment. The endpoints of a road segment correspond to the locations of intersections, i.e., where one road segment connects to another road segment. In one type of database, the line that represents a road segment coincides with the centerline of the actual road segment. In a database representation of a road network, an entrance ramp, like the ramp 20 shown in FIG. 1A, forms an intersection with the road 10 to which it joins. Therefore, as shown in FIG. 1B, the road 10 is represented by two road segments 30 and 32 that meet at an intersection formed with a road segment 36 that represents the entrance ramp 20. In FIG. 1B, the intersection of road segments 30, 32 and 36 is represented by the node 34.

When actual roads, such as those shown in FIG. 1A, are represented by their centerlines, as shown in FIG. 1B, the intersection of the entrance ramp 20 with the road 10 is represented as a single point, i.e., the node 34 in FIG. 1B. By itself, this information does not convey the fact that ramp 20 actually merges into the road 10 over a distance 26. In order to indicate that an intersection actually occurs gradually along a merge lane, such as shown in FIG. 1A, additional data is included in the database. This additional data may be associated with the road segment record and may indicate what geographic feature, if any, is located adjacent to a road segment (or lane thereof). One way to provide this representation is described in U.S. Ser. No. 10/620,732, filed Jul. 16, 2003, Pat Pub. No. 2005/0004753, the entire disclosure of which is incorporated by reference herein. In the case of an adjacent feature that extends along only a portion of a road segment, such as a merge lane of gradually decreasing width, the database may define one or more subsegments of a road segment. The subsegment data indicates start and end locations of the subsegment, relative to its associated road segment, and the feature adjacent to the subsegment. Using this model, a subsegment may be defined and associated with the segment 36 indicating that a gradually decreasing merge lane is located adjacent to the segment along the portion 40 thereof. Another subsegment is defined and associated with the segment 32 indicating that a gradually decreasing merge lane is located adjacent to the segment along the portion 42 thereof. Another subsegment is defined and associated with the segment 30 indicating that a gradually decreasing merge lane is located adjacent to the segment along the portion 44 thereof. (Note that there are other ways to indicate the presence of a merge lane and the present embodiments are not limited to any specific implementation.)

The database may be coded with assumed lengths of merge lanes, for example, 300 feet. In this case, the database may be coded as having no merge lane or one of insufficient length according to some defined standard, where applicable.

FIG. 1C shows another portion of an actual road network. The road network includes a road 50. The road 50 includes three lanes 52, 54 and 56 for carrying traffic in the direction of travel indicated by the arrow 58. An entrance ramp 60 consisting of a single lane 62 connects to the road 50. The entrance ramp 60 carries traffic in the direction indicated by the arrow 64. As shown in FIG. 1C, the entrance ramp 60 does not gradually merge into the road 50. Unlike the entrance ramp 20 in FIG. 1A, the entrance ramp 60 in FIG. 1C merges abruptly to the road 50, either without any gradual merge lane at all or with a merge lane of insignificant length.

FIG. 1D illustrates how the portion of the road network in FIG. 1C is represented by data contained in a map database (such as the database 110 in FIG. 2). As explained above in connection with FIG. 1B, roads are each represented by data records that define lines that extend between nodes. Therefore, the connection between the entrance ramp 60 and the road 50 forms an intersection so that in the data representation, as shown in FIG. 1D, the line 50 consists of two road segments 70 and 72 that connect to another road segment 74 that represents the entrance ramp 60. The road segments 70, 72 and 74 connect to each other that the node 76.

Because the actual entrance ramp 60 (in FIG. 1C) does not merge gradually into the road 50, the data representation of these roads in FIG. 1D does not include any data (such as subsegment data) that indicates the presence of a merge lane of gradually decreasing width. Thus, from the data representation in FIG. 1D, it can be determined that the entrance ramp 60 connects abruptly with the road 50, i.e., without a merge lane.

In another configuration, the merge lane may be coincident with an exit lane such as occurs at cloverleaf intersections. Such a configuration is shown in FIG. 1E. In FIG. 1E, a road 80 carries traffic in the direction indicated by the arrow 82. An entrance ramp 84 carrying traffic in the direction indicated by the arrow 86 connects to the road 80. An exit ramp 88 carrying traffic in the direction indicated by the arrow 90 also connects to the road 80. In the area indicated by 92, a portion of the entrance ramp 84 and the exit ramp 88 cross and may actually coincide. Regardless of the effective length of the merge ramp for the entering traffic, the lane of this merge ramp might be considered potentially hazardous and of insufficient length if it is coincident with an exit lane as depicted in FIG. 1E.

FIG. 2 is a flowchart of a process 100. The process 100 is performed by a software program or routine that is run on a suitable computing platform, such as a database server, PC or plurality of PCs coupled together for parallel computing applications.

The process 100 uses a database 110 that contains data that represents the road network in a region. The region may be a country, such as the United States, Germany, France or Korea. Alternatively, the region may include several countries or an entire continent. According to another alternative, the region may include only a portion of a country, such as a state or several states or metropolitan areas.

The process 100 is performed by a map developer, such as NAVTEQ Corporation. Alternatively, the process 100 may be performed by another entity that has access to an editable version of a map database 110. For example, the process may be performed by a customer or licensee of NAVTEQ, such as a manufacturer of navigation systems or active safety systems, or by a traffic information services company or by a government office at any level.

The database 110 is in a format that can be edited. That is, new or updated information can be added to the database 110. Alternatively, the database 110 is in a format such that new information can be combined with the original data to form a new database that includes both the original data and new data. In one embodiment, the database is in an Oracle spatial format. Alternatively, the database may be in delivery format, such as GDF (Geographic Data File), SIF (Standard Interchange Format), or other formats, including proprietary formats.

As stated above, the database 110 contains data that represents the road network in the region. The database 110 contains information such as the locations (geographic coordinates, including altitude) of roads and intersections, road names, the three-dimensional shape of the roads including curvature, slope and bank, speed limits along roads, turn restrictions at intersections, addresses or address ranges along roads, the number of lanes each road has, lane width, lane markings, functional classes of roads, the locations of medians, and so on. The database may also contain information about other geographic features, such as bodies of water, parks, administrative areas (including municipal, state and country boundaries), and locations of points of interest, such as businesses, hospitals, police stations, and so on.

In FIG. 2, the process 100 examines data records that represents road segments (also referred to herein as a "links") to determine whether they represents a merge lane similar to the one shown in FIG. 1C or 1E. (The process 100 may use a procedure that examines in turn each data record that represents each road segment represented in the entire database.) In one step, data records that represent road segments that meet to form an intersection are read from the database 110 (Step 130). These road segment records may include data that indicate the number of road segments that meet, whether any of the road segments are entrance ramps or controlled access roads, restrictions on directions of travel, the angle (or bearing) of the road segments leading into or away from the intersection, and the presence or absence of a traffic signal (i.e., a traffic light or stop sign). This data is evaluated (Step 134). If the represented intersection of roads does not meet the initial criteria, i.e., it includes traffic signal, the process 100 proceeds to a step in which it is determined whether all the road segment records in the database have been examined (Steps 136 and 138). If there are more segment records to examine, the process 100 proceeds to get the next segment record (Step 130) and continues.

Referring back to Step 136, if the represented intersection of road segments describes a road configuration like the one depicted in FIG. 1C or 1E, e.g., no traffic signal, the process 100 proceeds to obtain the data that indicates the presence or absence of a merge lane (Step 142). As mentioned above, this information may be indicated by what geographic feature is located adjacent to a road or lane, or a subsegment thereof. This merge lane data is evaluated (Step 144). From an evaluation of the type of road intersection, as well as the merge lane data associated with the intersection, it is determined whether there exists an insufficient merge lane (similar to the roads shown in FIG. 1C or 1E). If examination of the intersection and merge lane data information indicates that there is a sufficient merge lane at a road intersection without a traffic signal, the process 100 proceeds to the step in which it is determined whether all the road segment records in the database have been examined (Steps 150 and 138) and if there are more segment records to examine, the process 100 proceeds to get the next segment record (Step 130).

Referring back to Step 150, if examination of the intersection's traffic control signals and merge lane data indicate that there is an insufficient merge lane along a road that connects to another without a traffic signal, the process 100 adds precautionary action data 160 to the database 110 (Step 156). The precautionary action data 160 indicates the presence of a feature in the road network where a precautionary action may be taken.

In determining whether to add precautionary action data to the database 110, a threshold may be used. For example, a merge lane of 25 meters or less would be considered insufficient. The threshold value may take into account the speed limits along the respective road lanes, the angle at which the roads meet, and so on.

After the precautionary action data 160 is added to the database 110, the process 100 proceeds to the step in which it is determined whether all the road segment records in the database have been examined (Step 138) and if there are more segment records to examine, the process 100 proceeds to get the next segment record (Step 130).

The process 100 ends when it is determined whether all the intersections have been examined (Step 138).

It is noted that the process 100, above, performs a data mining function. The existence of the potentially difficult location, i.e., an intersection with an insufficient merge lane, is derived from data already collected and present in the database. It is noted that the process 100, above, evaluates multiple data items in the original database, to determine whether the condition exists, in this case, an insufficient merge lane. By evaluating these multiple data items, a determination is made whether these multiple data items describe the condition of interest. If these data items do describe the condition, a new data item, i.e., the precautionary action data, is added to the database.

The above process for determining whether an insufficient merge lane exists can take into account other factors, such as speed limits, road surface, the angle at which the roads meet, the functional classes of the roads, and so on.

Figure 3:
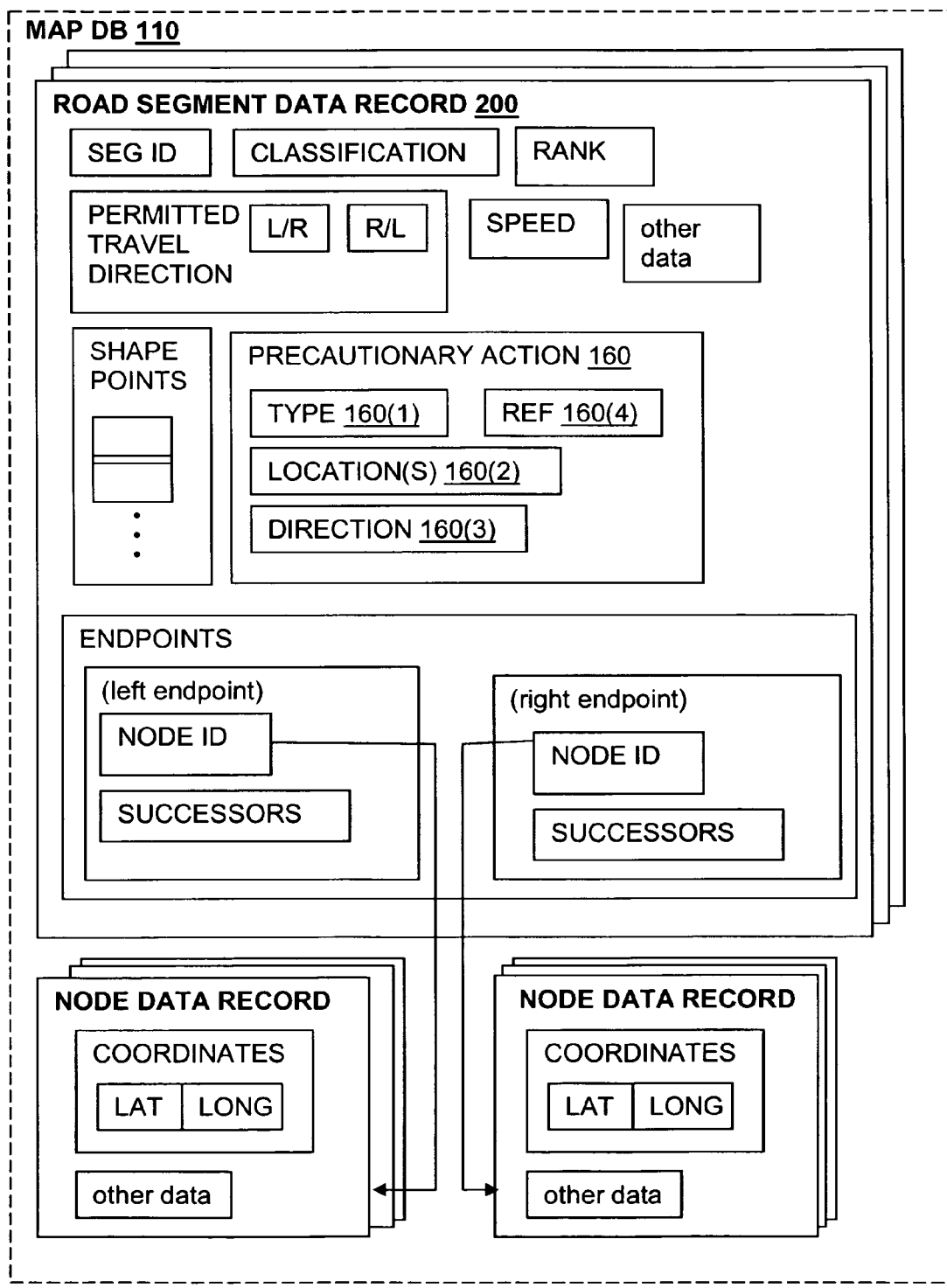
FIG. 3 is a diagram of a data record formed by the process of FIG. 2.

FIG. 3 is a diagram that shows a data record 200 in the database 110. The data record 200 represents a road segment located in a geographic region. As explained above, the geographic region may include an entire country or continent. Accordingly, the database 110 includes many data records like the one shown in FIG. 3.

The data record 200 shown in FIG. 3 is exemplary and shows only one way to represent a road segment. Databases may represent road segments in various different ways and may include different kinds of information. The present invention is not limited to any particular way of representing roads.

Referring to FIG. 3, various data are associated with the data record 200 that represents a road segment. This various data indicates features or attributes of the represented road segment. For example, associated with the data record is data that indicates the permitted direction(s) of travel. Also associated with the road segment record 200 are data that indicate a speed limit, a classification of the road segment (i.e., the type of road, such as controlled access, etc.), a rank (e.g., 1-4), the endpoints of the road segment, shape points (i.e., locations along the road segment between its endpoints). Also associated with the road segment records is data that indicate the successors at each endpoint. Successors are those road segments that connect to the represented road segment at each of its endpoints. The segment record 200 may identify these successors by reference to the data records that represent the successors.

In FIG. 3, the database 110 also includes precautionary action data 160. The precautionary action data 160 is the data added to the database 110 by the process 100 in FIG. 2. In FIG. 3, the precautionary action data 160 is shown as added to the road segment record 200. It should be understood that the process 100 adds precautionary action data 160 with respect to only certain records, i.e., records that represent those roads segments that meet the conditions identified by the process. Accordingly, the database 110 will contain data records that represent road segments that contain the precautionary action data 160 and other data records that represent road segments that do not contain the precautionary action data 160.

In the embodiment shown in FIG. 3, the precautionary action data 160 is associated with a road segment leading to an insufficient merge lane. In this embodiment, the precautionary action data 160 includes several components. One component 160(1) indicates a condition type. This condition type 160(1) indicates the type of condition about which a precautionary action is to be taken, which in this case is an insufficient merge lane. This condition type 160(1) component is used when different conditions are identified in the database 110 about which precautionary action may be taken.

Another component of the precautionary action data 160 is the precautionary action location 160(2). The precautionary action location 160(2) indicates where along the represented road segment a precautionary action may be taken. The precautionary action location 160(2) data may include multiple entries. For example, the precautionary action location 160(2) may indicate where a warning may be provided to a vehicle driver to advise the driver about the upcoming condition, i.e., the insufficient merge lane. In the case of an insufficient merge lane, the warning location 160(2) may indicate a distance (e.g., x meters) from the intersection of roads. The location 160(2) is determined based on an analysis of factors, such as the curvature, the speed limit along the represented road segments, the road classification, and possibly other factors. These factors may be determined from other data contained in the database 110. According to one example, the location 160(2) may indicate that a warning should be provided at a location 400 meters along each of the road segments leading into the insufficient merge lane.

The precautionary action location 160(2) may also indicate where a vehicle control action should be taken, such as tightening the seatbelts, pre-loading or engaging the brakes, tightening sensitivities of lane departure warning systems or stability control systems, etc. This may be a different location from where the precautionary warning is provided and would be based on a different analysis of factors.

Another component of the precautionary action data 160 is direction data 160(3). The direction data 160(3) indicates the direction along the represented road segment where the precautionary action should be taken. In this case, the direction data 160(3) indicates the direction into the intersection of roads. (Note that the database 110 may indicate a direction along a road segment as positive or negative based on the relative latitude and longitude of the road segment endpoints.)

Another component of the precautionary action data 160 is a reference 160(4). In this case, the reference 160(4) indicates the location of the insufficient merge lane. The reference 160(4) may refer to the actual intersection of road segments lacking a sufficient merge lane.

The precautionary action data 160 described in FIG. 3 is one way that this data may be included in a database that represents a geographic region. There are alternative ways to include the precautionary action data. For example, the precautionary action data may be included as separate data records in the database 110. If included as separate data records, the precautionary action data may be associated with the road segments to which they apply by pointers or other suitable data references. Alternatively, the precautionary action data may be associated with node data records, instead of the road segments leading to the intersections. Various other ways exist and the present invention is not intended to be restricted to any specific implementation.

Figure 4:
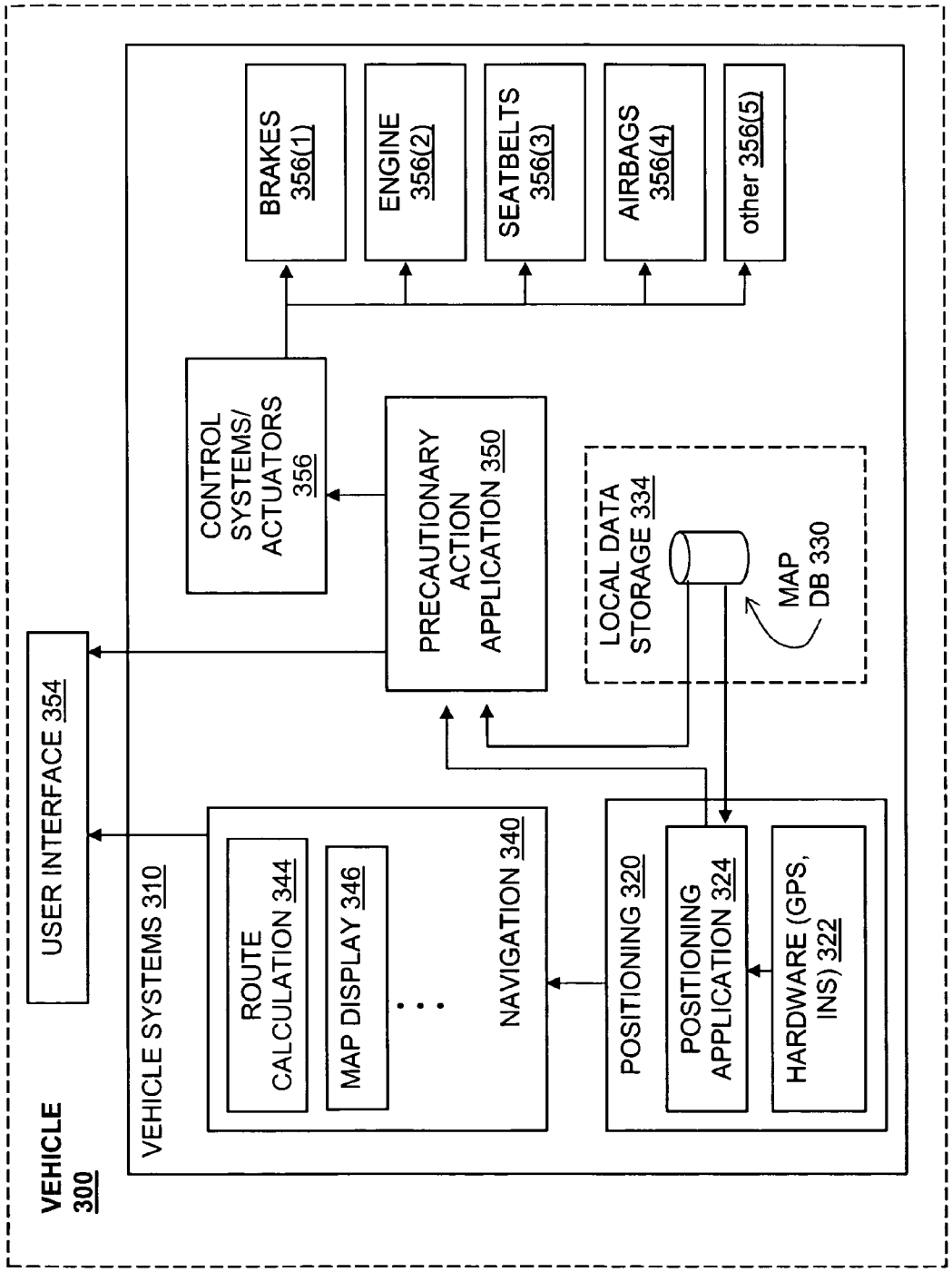
FIG. 4 is a diagram of a vehicle system that uses data produced by the process of FIG. 2.

FIG. 4 is a diagram depicting components of a vehicle 300. The vehicle 300 is operated on a road network, such as the road network represented by the database 110 in FIG. 2. The vehicle 300 may be an automobile, truck, bicycle, motorcycle, etc.

The vehicle 300 includes systems 310. In this embodiment, the vehicle systems 310 include a positioning system 320. The positioning system 320 determines the position of the vehicle 300 on the road network. The positioning system 320 includes appropriate hardware and software to determine the position of the vehicle 300. For example, the positioning system may include hardware 322 that includes a GPS unit, an accelerometer, wheel speed sensors, etc. The positioning system 320 also includes a positioning application 324. The positioning application 324 is a software application that uses outputs from the positioning system hardware 322 and information from a map database 330. The positioning application 324 determines the position of the vehicle 300 with respect to the road network, including the location of the vehicle 300 along a road segment and a direction of travel of the vehicle along the road segment.

In one embodiment, the map database 330 is located in the vehicle. In an alternative embodiment, the map database 330 may be located remotely and accessed by the vehicle systems 310 using a wireless communication system. In yet another embodiment, part of the map database 330 may be located locally in the vehicle and part of the map database 330 may be located remotely.

The map database 330 is stored on a computer readable medium 334. The computer-readable medium may be implemented using any suitable technology. For example, the computer readable medium may be a DVD disk, a CD-ROM disk, a hard disk, flash memory, or any other medium, or a plurality of media.

The map database 330 includes data that represents the geographic region in which the vehicle 300 is being operated. The map database 330 may represent the same geographic region as the database 110 in FIG. 2, or alternatively, the map database 330 may represent only a portion of the region represented by the database 110.

The map database 330 used by the vehicle systems 310 may be in a different format from the database 110 in FIG. 2. The map database 330 is formed or derived from the database 110 by a compilation process that organizes and presents the data in a form and format that specifically facilitates its use for performing specific functions. For example, the map database 330 may be separated into different collections of data that are used for specific functions, such as vehicle positioning, route calculation, map display, route guidance, destination selection, and so on. The map database 330 may also be organized into groupings spatially. One kind of compiled database format is disclosed in U.S. Pat. No. 5,968,109, the entire disclosure of which is incorporated by reference herein. Various other compiled database formats exist, including proprietary formats, and the disclosed embodiment(s) are not limited to any particular format.

Included among the vehicle systems 310 in FIG. 4 is a navigation system 340. The navigation system 340 uses outputs from the positioning system 320 and data from the map database 330 to provide navigation-related features to a vehicle user, e.g., the vehicle operator or passenger. The navigation system 340 includes applications for route calculation 344, map display 346, as well as possibly other applications. The navigation system 340 provides the navigation-related features to the vehicle user via a user interface 354. (The navigation system 340 is optional and may be omitted.)

Also included among the vehicle systems 310 is a precautionary action application 350. The precautionary action application 350 uses outputs from the positioning system 320 and data from the map database 330 to take precautionary actions, such as provide warnings to the vehicle operator. The precautionary action application 350 provides the warning to the vehicle operator via the user interface 354.

FIG. 4 also shows that precautionary action application 350 provides an output to vehicle control systems and actuator 356. The vehicle control systems and actuator are operatively connected to various vehicle mechanical systems, such as the vehicle's brakes 356(1), engine 356(2), seatbelts (including tensioners) 356(3), airbags 356(4), stability control algorithms, as well as other system systems 356(5).

Figure 5:
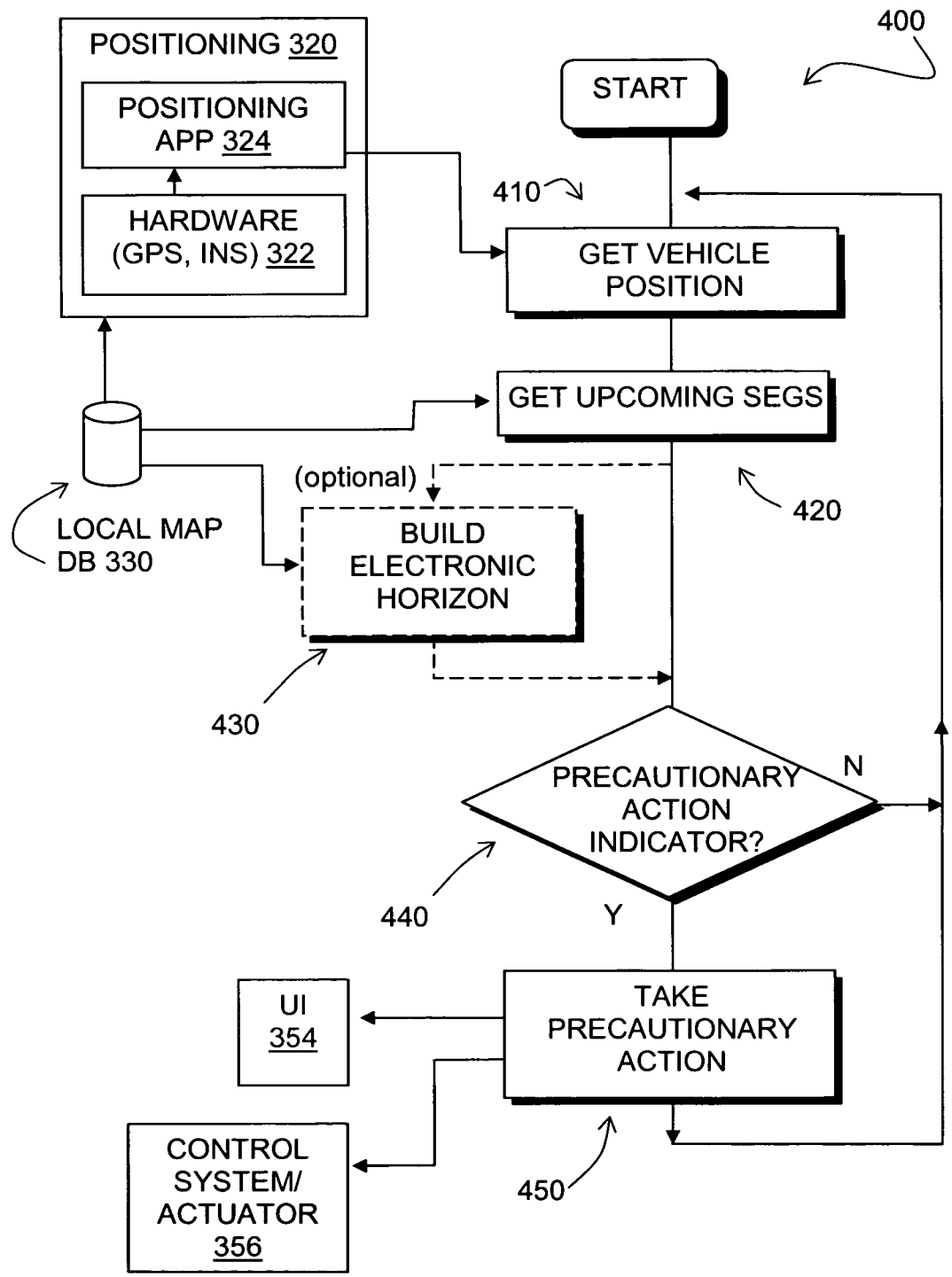
FIG. 5 is a flowchart of a process performed by the system of FIG. 4.

FIG. 5 is a flowchart 400 showing operation of the precautionary action application 350 (in FIG. 4). As the vehicle 300 (in FIG. 4) is being operated on a road, the precautionary action application 350 obtains the current vehicle position from the positioning system 320 (Step 410). (During vehicle operation, the positioning system 320 continuously determines the current geographic position of the vehicle 300 as the vehicle is being operated using data from the map database 330.) The positioning system 320 provides the precautionary action application with data that indicates the current vehicle position with respect to the road network as represented by the map database 330. Specifically, the location of the vehicle along a road segment and the direction of travel of the vehicle along the road segment are determined and provided to the precautionary action application 350.

Next, the process 400 obtains data from the map database 300 that represents the geographic features (i.e., roads, intersections, etc.) at the current location of the vehicle and in the direction in which the vehicle is heading (Step 420). In one embodiment, an electronic horizon is used (Step 430). Building an electronic horizon and using it to provide warnings are disclosed in U.S. Pat. Nos. 6,405,128 and 6,735,515 and U.S. patent application Ser. No. 11/400,151, the entire disclosures of which are incorporated by reference herein. Using an electronic horizon and/or the inventions disclosed in these patents and pending patent application is optional and the disclosed process 400 is not limited to using the electronic horizon technology.

After obtaining data from the map database 300 that represents the geographic features at the current location of the vehicle and in the direction in which the vehicle is heading, the process 400 includes the step of examining the data to determine whether any precautionary action data (160 in FIG. 3) is associated with the represented geographic features (Step 440). If there is no precautionary action data associated with the represented geographic features, the process 400 loops back to get a new current vehicle position (Step 410). On the other hand, if there is precautionary action data associated with the represented geographic features, the process 400 takes a precautionary action (Step 450). The precautionary action may be a warning provided to the vehicle operator when the vehicle is at the location (i.e., 160(2) in FIG. 3) indicated by the precautionary action data. The warning may be provided via the user interface 354. The warning may be an audible warning message or a visual warning.

The precautionary action is not limited to warnings, but may also include other actions. For example, in the case of an insufficient merge lane, vehicle systems 356, such as the brakes, engine or transmission, can be readied for a deceleration. In addition, the seatbelts may be tightened or the airbags set to deploy. As explained above, to facilitate these kinds of actions, additional information may be added to the warning data 160 (in FIG. 3) to indicate the type of action as well as the location where the action should be taken.

Referring still to FIG. 5, after taking the precautionary action, the process 400 Loops back to get a new current vehicle position (Step 410).

Alternative with Dynamic Data

The process (400 in FIG. 5) was described as a way to use the precautionary action data that had been stored in the map database to take an appropriate action in a vehicle when the vehicle is at or is approaching a location identified as having a potentially hazardous condition. This process uses a positioning system and map database in the vehicle to determine when the vehicle is at or is approaching such a location. The process may also take into account dynamic information. Dynamic information may include current traffic and weather conditions, ambient light conditions, road conditions (e.g., ice), and so on. The vehicle may include systems to obtain such information. For example, the vehicle may have a traffic data receiver that obtains real-time traffic information, e.g., RDS-TMC messages. The process 400 may use the dynamic information in combination with the precautionary action data. For example, the process may modify the location at which a warning is provided. As an example, if weather conditions indicate that it is raining, the location at which a warning is provided to the vehicle driver about an upcoming insufficient merge lane may be modified, i.e., adjusted to a point farther in advance of the location of the hazardous condition, in order to give the vehicle operator additional time or distance. The process may even take certain actions only under certain conditions. For example, a warning about an insufficient merge lane may be provided only during nighttime hours or during inclement weather conditions.

Verification

The process (100 in FIG. 2) was described as a way to automatically examine records in a database that represent roads to identify locations or conditions along the road network where a precautionary action might be taken. According to the described process, data is then added to indicate the location where the precautionary action should be taken. Alternatively, instead of automatically adding the precautionary action data to the database, the locations where such conditions are identified could be marked on a temporary basis. Then, a geographic analyst (or other human operator) could review some or all such temporarily marked locations. The analyst may conduct this review by physically traveling to the locations or by reviewing satellite or aerial photographs of the locations, or video taken while driving by the locations (previously or subsequently acquired either by the analyst or others including members of the public). Based on the review, the analyst then determines whether precautionary action data should be added to the database.

It is intended that the foregoing detailed description be regarded as illustrative rather than limiting and that it is understood that the following claims including all equivalents are intended to define the scope of the invention.

I claim:

1. A method for making an augmented version of a database that is operable as a component in a vehicle system that provides a precautionary action in a vehicle when the vehicle approaches a potentially hazardous location, wherein the potentially hazardous location comprises one at which two conditions are present at a same location along a road network in a geographic region wherein one of the two conditions comprises absence of a traffic signal and another of the two conditions comprises a merge lane of insufficient dimensions, the method comprising:

with a computer operating under programming instructions, selecting data contained in a first version of a database to identify locations of intersections located throughout the geographic region where roads meet without a traffic signal and without a sufficient merge lane; and forming, prior to the vehicle's approach to the potentially hazardous location, the augmented version of the database by adding precautionary action data to the database to indicate said potentially hazardous locations at which a precautionary action is to be taken by the vehicle system such that a determination can be made by the vehicle system whether to take a precautionary action based on an evaluation of the precautionary data in the augmented version of the database at a later time when the vehicle is at or near the potentially hazardous location.

2. The method of claim 1 further comprising:
selecting from the first version of the database a data records that represent an intersection of roads;
upon determining that no traffic signal is located at the intersection, obtaining data from the first version of the database that indicate whether a merge lane exists along the roads; and
upon determining that the intersection does not have a traffic signal and does not have a merge lane, adding the precautionary action data to the first version of the database to indicate the presence of a condition for which a precautionary action is to be taken.

3. The method of claim 2 further wherein the intersection is determined not to have a merge lane by evaluating data that indicates what geographic feature is adjacent to the roads leading to the intersection.

4. The method of claim 2 further comprising:
continuing to select from the first version of the database data that represent intersections to identify all locations of intersections that do not have a traffic signal and do not have a merge lane.

5. The method of claim 2 further comprising:
continuing to select from the first version of the database data that represent intersections until all data records that represent intersections have been selected.

6. The method of claim 1 further comprising:
compiling the augmented version of the database into a format suitable for use in a navigation system.

7. The method of claim 1 wherein the step of using data contained in the first version of the database comprises evaluating at least two items of data contained in the first version of the database to determine whether an intersection lacks a sufficient merge lane.

8. A database stored on a non-transitory computer-readable medium, wherein the database includes data that represents a road network in a geographic region and wherein the database is operable as a component in a vehicle system that provides warnings when approaching potentially hazardous locations, wherein the database comprises:

data records that represent road segments that make up the road network;

data that indicates merge lanes along the road segments; and data that indicates precautionary action locations, wherein a precautionary action location is associated with a location at which two conditions are present at a same location, wherein one of the two conditions comprises no merge lane or an insufficient merge lane and another of the two conditions comprises an intersection of roads without a traffic signal, such that the vehicle system need only perform a single evaluation to determine whether the precautionary data exists in the database to determine whether a precautionary action is to be taken upon approach to the potentially hazardous location.

9. The database of claim 8 wherein the precautionary action data further includes data that indicates a location along a road segment at which a precautionary action is to be taken by a vehicle system.

10. The database of claim 8 wherein the precautionary action data further includes data that indicates a direction along a road segment at which a precautionary action is to be taken.

11. The database of claim 8 wherein the precautionary action data further includes data that refers to the location of the actual intersection with the insufficient merge lane.

12. The database of claim 8 further comprising data that indicates permitted directions of travel along road segments, speed limits along road segments, classifications of road segments, and locations of road segments.

13. The database of claim 8 further comprising data that identifies speed limits road segments.

14. A vehicle system comprising:
a database that contains data representing a geographic region in which a vehicle is being operated, wherein the data includes data that represents a road network located in the geographic region and precautionary action data that indicates precautionary action locations associated with locations where insufficient merge lanes exist at intersections of roads without traffic signals such that the vehicle system need only perform a single evaluation to determine whether the precautionary data exists in the database to determine whether a precautionary action is to be taken upon approach to the potentially hazardous location;

a positioning system that determines a current location of the vehicle relative to the data in the database representing a geographic region; and a precautionary action application executed on a processor and responsive to the positioning system and the database wherein the precautionary action application determines whether the precautionary data exists in the database in associate with the current location of the vehicle and, based thereon, provides a precautionary action when the positioning system determines that the precautionary data exists in the database indicative that the current location of the vehicle is approaching an intersection without a traffic signal and with an insufficient merge lane.

15. The system of claim 14 wherein the precautionary action data further includes data that indicates a location along a road segment at which a precautionary action is to be taken by a vehicle system.

16. The system of claim 14 wherein the precautionary action data further includes data that indicates a direction along a road segment at which a precautionary action is to be taken.

17. The system of claim 14 wherein the precautionary action data further includes data that refers to the location of the actual location of the intersection with the insufficient merge lane.

18. A method performed with a program executed on a processor in a vehicle system for providing precautionary actions in a vehicle comprising:
    accessing a database that includes data representations of a road network;
    determining a current position of the vehicle relative to the road network represented by the database; and
    upon determining that data representations of a part of the road network around the current position of the vehicle includes precautionary action data, the precautionary action data being indicative of an upcoming intersection without traffic signals and without a sufficient merge lane, taking a precautionary action, based on the inclusion of precautionary action data in the data representation of the part of the road network around the current position of the vehicle as the vehicle is approaching the intersection.

19. The method of claim 18 further comprising:
    building an electronic horizon after accessing the database; and
    using the electronic horizon to determine whether precautionary action data is included therein.

20. The method of claim 18 wherein the precautionary action is provided via a user interface of the vehicle.

* * * * *